(12) United States Patent
Lai et al.

(10) Patent No.: US 12,175,966 B1
(45) Date of Patent: Dec. 24, 2024

(54) ADAPTATIONS OF TASK-ORIENTED AGENTS USING USER INTERACTIONS

(71) Applicant: Amazon Technologies, Inc., Seattle, WA (US)

(72) Inventors: Yi-An Lai, Bellevue, WA (US); Yi Zhang, Sammamish, WA (US); Roger Scott Jenke, Seattle, WA (US); Meghana Puvvadi, Seattle, WA (US); Shang-Wen Daniel Li, Somerville, MA (US); Peng Zhang, Santa Clara, CA (US); Jason P. Krone, Pacific Grove, CA (US); Garima Lalwani, Delhi (IN); Niranjhana Nayar, Seattle, WA (US); Kartik Natarajan, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 621 days.

(21) Appl. No.: 17/361,003

(22) Filed: Jun. 28, 2021

(51) Int. Cl.
| | |
|---|---|
| *G10L 15/22* | (2006.01) |
| *G06N 5/04* | (2023.01) |
| *G06N 20/00* | (2019.01) |
| *G10L 15/06* | (2013.01) |
| *G10L 15/18* | (2013.01) |
| *H04L 51/02* | (2022.01) |
| *G10L 15/16* | (2006.01) |

(52) U.S. Cl.
CPC .............. *G10L 15/063* (2013.01); *G06N 5/04* (2013.01); *G06N 20/00* (2019.01); *G10L 15/18* (2013.01); *H04L 51/02* (2013.01); *G10L 2015/0636* (2013.01); *G10L 2015/0638* (2013.01); *G10L 15/16* (2013.01); *G10L 15/1815* (2013.01); *G10L 15/1822* (2013.01); *G10L 15/22* (2013.01)

(58) Field of Classification Search
None
See application file for complete search history.

(56) References Cited

U.S. PATENT DOCUMENTS

| | | | | |
|---|---|---|---|---|
| 10,068,174 | B2* | 9/2018 | Aili | G06F 9/445 |
| 10,073,840 | B2* | 9/2018 | Hakkani-Tur | G06F 40/40 |
| 10,140,977 | B1* | 11/2018 | Raux | G10L 15/063 |
| 11,393,475 | B1* | 7/2022 | Aili | G10L 15/22 |
| 11,423,225 | B2* | 8/2022 | Shen | G06F 40/279 |
| 11,501,753 | B2* | 11/2022 | Shen | G10L 15/04 |
| 11,508,360 | B2* | 11/2022 | Peng | G06F 40/284 |
| 11,568,855 | B2* | 1/2023 | Zhao | G06N 5/022 |
| 2014/0380285 | A1* | 12/2014 | Gabel | G06N 5/022 717/139 |
| 2018/0089572 | A1* | 3/2018 | Aili | G06F 9/453 |

(Continued)

*Primary Examiner* — Richard Z Zhu
(74) *Attorney, Agent, or Firm* — Nicholson De Vos Webster & Elliott LLP

(57) ABSTRACT

Techniques for updating a machine learning model based on user interactions are described. In particular, in some examples, user interactions with a chatbot provide aspects of a data set to be used to train or fine-tune a ML model. In some examples, this is accomplished by collecting data from a first plurality of interactions with a machine learning (ML) model; generating a variant of the ML model using the collected data by: filtering the collected data to create a first data set, training the ML model based on the first data set to generate an adapted ML model, and fine-tuning the adapted ML model on a second data set, different than the first data set to generate the variant of the ML model.

20 Claims, 12 Drawing Sheets

(56) References Cited

U.S. PATENT DOCUMENTS

| | | | |
|---|---|---|---|
| 2020/0279105 A1* | 9/2020 | Muffat | G06N 3/08 |
| 2020/0327284 A1* | 10/2020 | Sapugay | G06N 3/006 |
| 2020/0410989 A1* | 12/2020 | Ray | G06F 40/216 |
| 2021/0004532 A1* | 1/2021 | Shen | G06F 40/279 |
| 2021/0397610 A1* | 12/2021 | Singh | G06N 7/01 |

\* cited by examiner

ADAPTATIONS OF TASK-ORIENTED AGENTS USING USER INTERACTIONS

BACKGROUND

Large domain chatbots are now omnipresent, reaching many people through services. Recent efforts have been more focused towards basic chit-chat that are non-goal oriented. Chit-chat refers to the ability to generate fluent responses that are reasonable in the context of the conversation. In contrast, in task or goal-oriented dialog, the chatbot needs to extract relevant information from the user (e.g., preferences), provide relevant knowledge to the user (e.g., prices and availability), and issue appropriate system calls (e.g., make a payment).

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for updating a machine learning model based on user interactions.

When bot definitions are defined, they cannot capture all the linguistic variations (e.g., style, words, grammar, etc.) that will come from real users when they interact with the bots. As such, the models trained from these bot definitions will have less than optimal responses to variations that were not anticipated by the bot definition.

Detailed herein are descriptions of embodiments of self-supervised and/or unsupervised machine learning algorithms to leverage "live" (user) traffic conversations for adaptation of the natural language understanding component of a task-oriented conversational agent. Through either masked language model adaptation or self-training on joint intent classification and slot labeling with high-confidence model predictions, a natural language understanding (NLU) model is trained to adapt better toward new and out-of-distribution real-world phenomena after deployment. The training also allows the model to dynamically adjust its behavior to accommodate for the distribution shift over time. These model training workflow can be implemented in a cloud-hosted chatbot platform in a secure environment in siloed instances with customer opt-ins. In some embodiments, this modified training artifact is evaluated against some part of live data or customer provided test sets to evaluate the accuracy improvement before promoting the models to be used against live traffic again.

Figure 1:
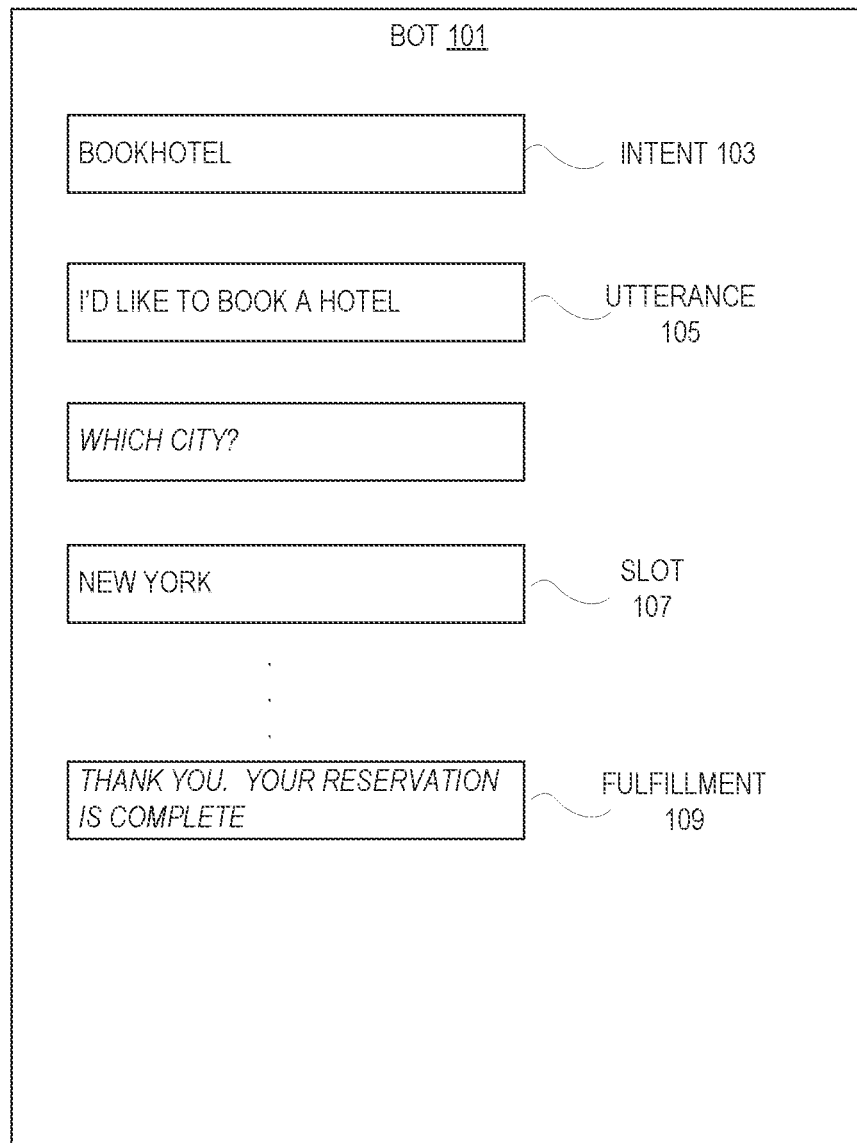
FIG. 1 illustrates an embodiment of a bot usage.

FIG. 1 illustrates an embodiment of a bot usage. In this example, the bot 101 is used to intake user input (such as utterances) and provide responses to the input (shown in italics). In this example, the intent 103 of the bot 101 is to book a hotel. An intent represents an action to take in response to natural language input. In particular, an intent is a task/goal for an agent (such as a chatbot) that is necessary in order to fulfill a user's request. Intents may use (1) custom slot types defined specifically for a domain (e.g., a "book_hotel" slot for a trip planning domain) or (2) built-in slot types that can express intents that are general enough to be applied across many domains (e.g., a "greeting" slot which can be applied to almost any domain). A slot is a list of values used to train a machine learning model to recognize values for a slot (e.g., the value "New York" in this example).

A user provides an utterance 105 in the form of a spoken or typed phrase that invokes the intent 103. Slots 107 are input data required to fulfill an intent. As such, slots 107 represent parameters that have to be asked and assigned values in order to fulfill an intent in a user's request. For example, in order to successfully complete a book_hotel reservation, an agent would require information about multiple slots such as, for example, the "start_date" and the "end_date" (which represent the check-in and check-out dates), the "location_to" (which represents the place where the user is traveling to) and other preferences of the user like "price_range." The list of possible values these slots 107 may be restricted to include (1) custom values (for the example dataset above, "location_to" can be the name of a US city such as, for example, San Jose, Seattle, etc.) or (2) built-in types, such as builtin.date for the slot labeled "start_date" or "end_date."

Finally, the bot 101 provides an indication of fulfillment.

Figure 2:
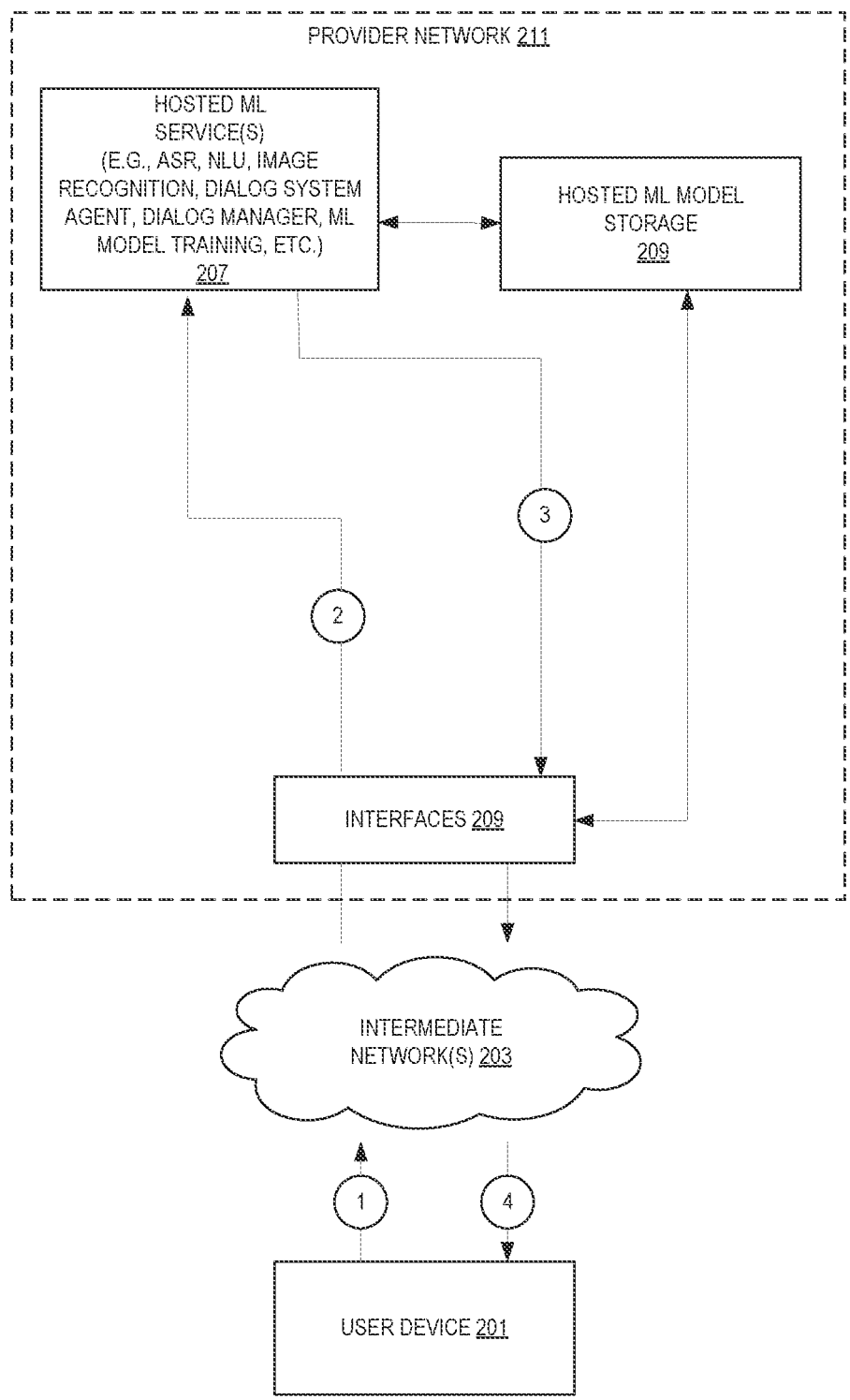
FIG. 2 illustrates embodiments of a system generating training data for a bot, training a bot, and/or hosting a bot or other service including for performing inference for natural language understanding (NLU), image recognition, and/or automatic speech recognition (ASR).

FIG. 2 illustrates embodiments of a system generating training data for a bot, training a bot, and/or hosting a bot or other service including for performing inference for natural language understanding (NLU), image recognition, and/or automatic speech recognition (ASR). As shown, a provider network 211 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. for at least NLU. These and other computing resources may be provided as services, such as a hardware virtualization service that can execute compute instances, a storage service that can store data objects, etc. The users (or "customers") of provider networks 211 may utilize one or more user accounts that are associated with a customer account, though these terms may be used somewhat interchangeably depending upon the context of use. User devices 201 may interact with a provider network 211 across one or more intermediate networks 203 (e.g., the internet) via one or more interface(s) 209, such as through use of application programming interface (API) calls, via a console implemented as a website or application, etc. The interface(s) 209 may be part of, or serve as a front-end to, a control plane of the provider network 211 that includes "backend" services supporting and enabling the services that may be more directly offered to customers.

. A provider network 211 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 211 can use one or more user accounts that are associated with a customer account, though these terms can be used somewhat interchangeably depending upon the context of use. Users can interact with a provider network 211 across one or more intermediate networks 203 (e.g., the internet) via one or more interface(s) 209, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 209 can be part of, or serve as a front-end to, a control plane of the provider network 211 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 211 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

In this illustration, the provider network 211 provides several bot related services 207 including, for example, NLU services, ASR services, support for hosting a dialog system agent, dialog training data generation, machine learning (ML) model training (e.g., bot training), etc.

When the application 205 is a bot, the illustrated circles represent actions that may occur. As shown, at circles 1 and 2, a user device 201 communicates with the provider network 211 via intermediate networks 203 and interfaces 209. In particular, the user device 201 communicates with a hosted ML service 207 (such as a bot including a dialog system agent). An example of a communication is an "utterance" to be handled by the bot. The hosted ML service 207 hosts ML models for different entities on a shared fleet of physical and/or virtual hosts. The hosted ML models may be custom (for example, user provided) or provided by the service. The bot may call other hosted ML services 207 such as the ASR and NLU services in response to received utterances, etc. Hosted ML model storage 209 stores models for NLU services, ASR services, support for hosting a dialog system agent, dialog training data generation, and ML model training.

The results of the bot are returned at circle 3 and then forwarded back to the user device 201 as needed in circle 4.

When training of a NLU of a bot is to be generated, these same illustrated circles represent actions that may occur for that process. As shown, at circles 1 and 2, a user device 201 communicates with the provider network 211 via intermediate networks 203 and interfaces 209. In particular, the user device 201 communicates with a ML updater which is a hosted ML service 207. The user provides a request to update at least an NLU training data for a bot.

The ML updater (a hosted ML service 207) generates the updates the ML model using one or more of the techniques detailed herein.

An indication of an update is returned at circle 3 and then forwarded back to the user device 201 as needed in circle 4.

Figure 3:
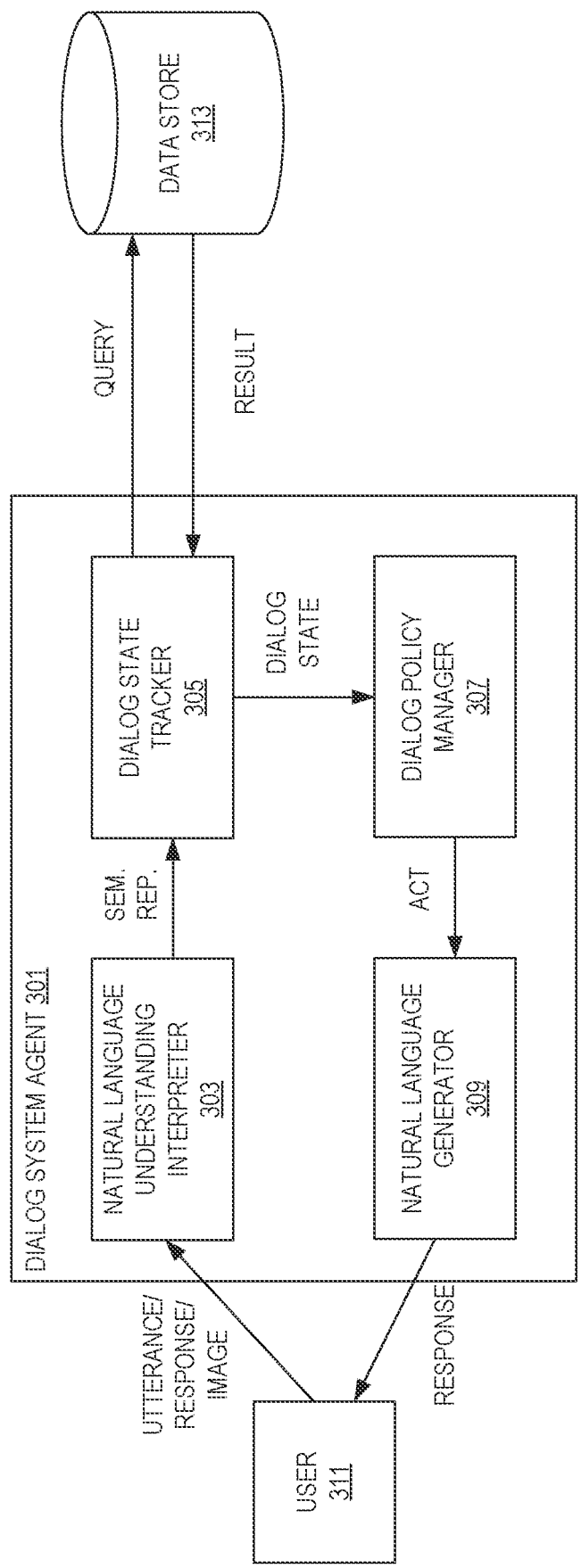
FIG. 3 illustrates embodiments of a dialog system agent such as a chatbot.

FIG. 3 illustrates embodiments of a dialog system agent such as a chatbot. The dialog system agent 301 is typically a collection of software components stored in memory and executed by one or more processors. In some embodiments, one or more of the components are models and/or are a part of a larger model (such a rule based or machine learning).

As illustrated, the dialog system agent 301 includes many individual components, each responsible for performing a specific sub-task. A Natural Language Understanding (NLU) interpreter 303 maps a user's 311 utterance, provided image, or response text into a semantic representation. A Dialog State Tracker (DST) 305 updates its belief of the state of the system based on a history of the dialog (based on queries and results from the data store 313) and the semantic representation. A Dialog Policy Manager (DPM) 307 predicts the next action given the output of the DST 305. A Natural Language Generator (NLG) 309 converts the predicted action into text. In some instances, these components are typically trained independent of each other which may result in sub-optimal performance. However, in embodiments detailed herein, these components of the dialog system agent 301 are trained, end-to-end, together.

Figure 4:
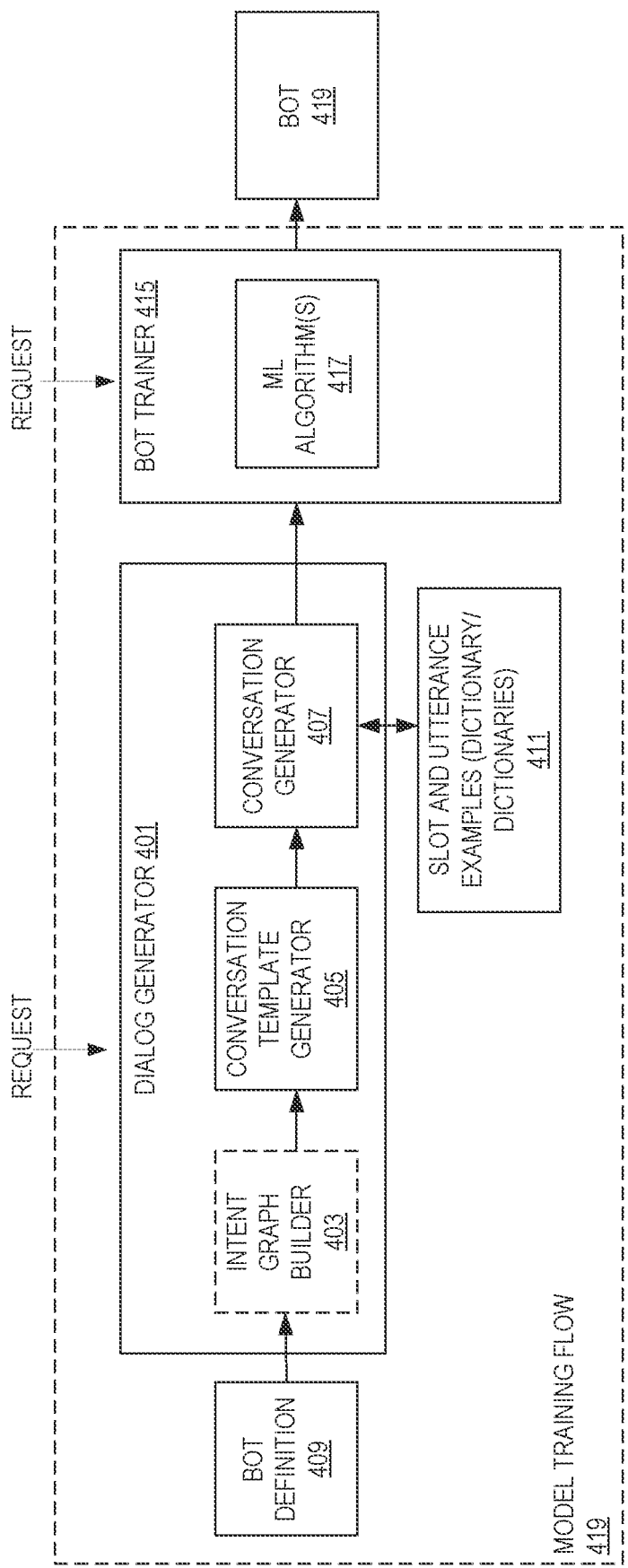
FIG. 4 illustrates embodiments of a dialog generator.

FIG. 4 illustrates embodiments of a dialog generator. The dialog generator 401 utilizes one or more components to generate dialog training data 413 and this dialog training data may be utilized to train one or more dialog system agents such as dialog system agent 301. In some embodiments, the components of the dialog generator 401 are software components stored in memory and executed in hardware. The dialog generator 401 typically operates in response to a received request that may include such information as a location of a bot definition (or include the bot definition), a location of one or more dictionaries to use, and the request may be a request to generate training data for a given bot or to generate training data and train a given bot, etc.

In some embodiments, one or more of the dialog generator 401 and bot trainer 415 are provided as one or more services of a provider network and/or the dictionaries 411 are stored in storage of a provider network (such as that detailed above). In some embodiments, one or more of the dialog generator 401, dictionaries 411, and bot trainer 415 are implemented on a local device or by one or more non-provider network servers. The bot trainer 415 trains one more ML algorithms 471 (e.g., a NLU model) that are included in a bot 419. In some embodiments, the dictionaries 411 include a bot definition.

In some embodiments, the dialog generator 401 includes an intent graph builder 403. The intent graph builder 403 takes a bot definition 409 and generates a graph of intents (or "intent graph") wherein each path from a source to a sink indicates a possible intent trajectory including interactions between the bot and a user (such as slots to fill, utterances, prompts, etc.). A bot definition defines slots and/or intents. In some embodiments, a bot definition is a JavaScript Object Notation (JSON) file. In some embodiments, paraphrases are generated and/or inserted by the intent graph builder 403.

A conversation generator 407 takes in the conversation template(s) and samples slots and utterances from one or more dictionaries 411 to generate one or more conversations as conversation training data. The one or more dictionaries 411 are typically external to the dialog generator 401 but, in some embodiments, are a part of the dialog generator 401. In some embodiments, paraphrases are generated and/or inserted by the conversation generator 407.

The bot trainer 415 may then be utilized to train one or more machine learning algorithms 417 that are a part of the bot 419 to be trained. This training utilizes the generated conversation training data to generate a bot 419. In some embodiments, the dialog generator and bot trainer 415 are a part of a model training flow 419.

Figure 5:
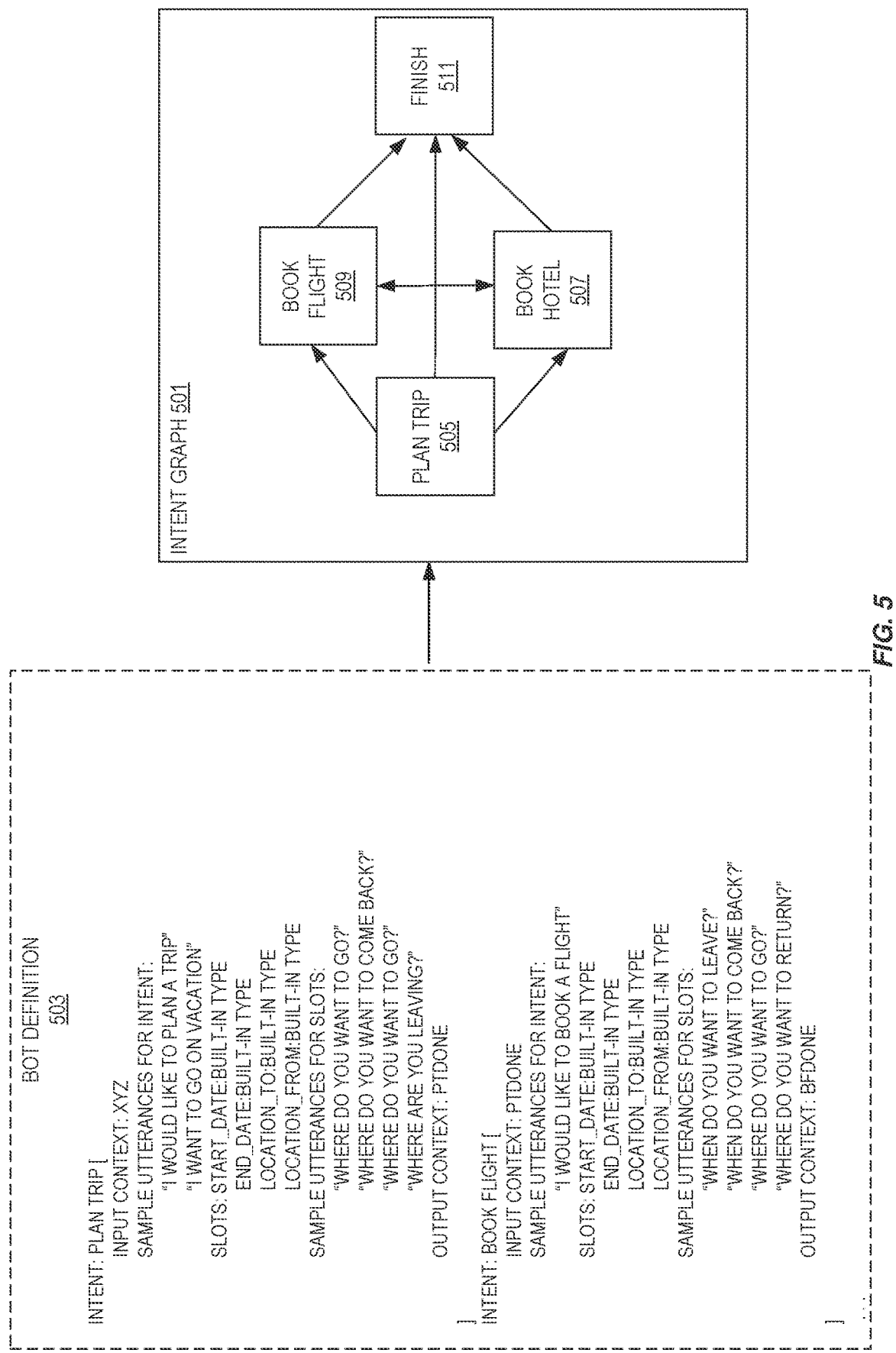
FIG. 5 illustrates an embodiment of an intent graph and a part of an exemplary bot definition.

FIG. 5 illustrates an embodiment of an intent graph and a part of an exemplary bot definition. As shown, a bot definition 503 is used as the basis of the intent graph 501. The bot definition 503 includes a plurality of intents (only two are shown) with each intent including one or more slots to fill in and their types, examples of slot prompts, and examples of utterances that signal the intent.

Each intent (shown here as plan trip 505, book flight 509, and book hotel 507) and their relationships are described as nodes in the intent graph. In this example, the initial intent (plan trip 505) is the first intent to be addressed with the bot followed by either the bot finishing (node 511) or one or book flight 509 or book hotel 507 being addressed. The book flight intent is a conditional intent requiring the plan trip intent to be complete as noted by context value PTDONE.

The graph of intents is consumed by a conversation template generator 405 which traverses the intent graph to generate a conversation template for each intent of the intent graph. A conversation template is a path through the graph. In some embodiments, the intent is traversed in a depth-first manner. Parameters dictating the actions of the conversation template generator 405 such as, for example, intents to consider, a number of conversations to generate, a number of unique paths to generate, and transition probabilities, are provided in a request. This request may be a request to generate training data for a given bot or to generate training data and train a given bot.

Figure 6:
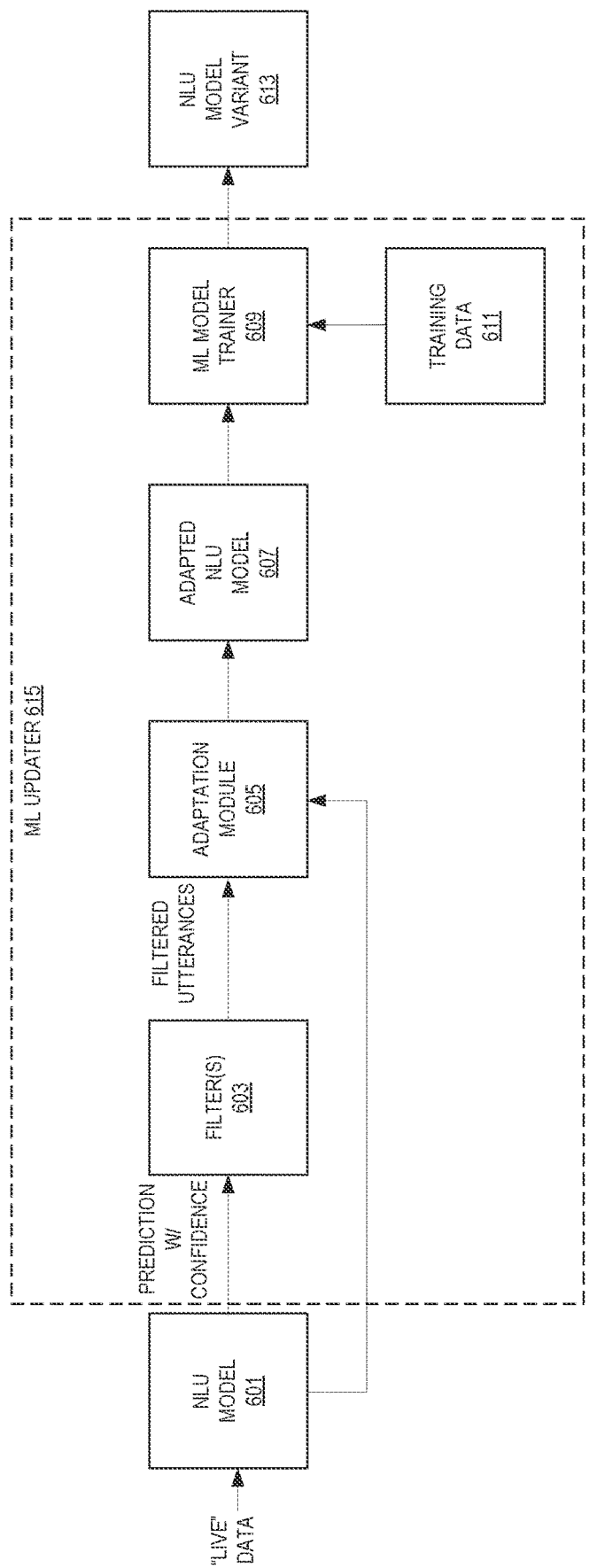
FIG. 6 illustrates embodiments showing the training of a NLU model.

FIG. 6 illustrates embodiments showing the training of a NLU model. This training approach, in some embodiments in a ML updater 615, may be considered a self-supervised adaptation approach. In some embodiments, a NLU model 601 intakes "live" data (utterances) from a user and generates a prediction (and in some embodiments, a confidence value).

One or more filters 603 are applied to the utterances to generate a subset of filtered utterances. In some embodiments, the one or more filters 603 filter out utterances that are too short, do not indicate an intent, have a low predicted confidence, have a predicted intent that does not match the bot definition for the model, and/or have already been used, etc.

The filtered utterances (those that survive the filtering) are then subjected to an adaptation component 605 to generate an adapted NLU model 607. In some embodiments, this adaptation component 605 performs aspects of model training such as pre-training. For example, in some embodiments, when the NLU is a transformer-based model (e.g., Bidirectional Encoder Representations from Transformers (BERT)-based), the adaptation component performs masked language model (MLM) tasks and/or next sentence prediction (NSP) tasks. In MLM, a proper subset of the tokens from each sequence are randomly masked (replaced with the token [MASK]). The model is trained to predict these tokens using all the other tokens of the sequence. In some embodiments, the adaptation component 605 starts with the initial NLU model 601.

The adapted NLU model 607 is then subjected to a model trainer 609 to generate a NLU model variant 613. The model trainer 609 trains the adapted NLU model 607 based on training data 611 from the bot definition, training data extracted from conversation data (e.g., using intents, templates, slot and utterance examples, etc.), etc. In some embodiments, the training kick off the generation of the training data from conversation data like that described in FIG. 4 in the model training flow 419.

Figure 7:
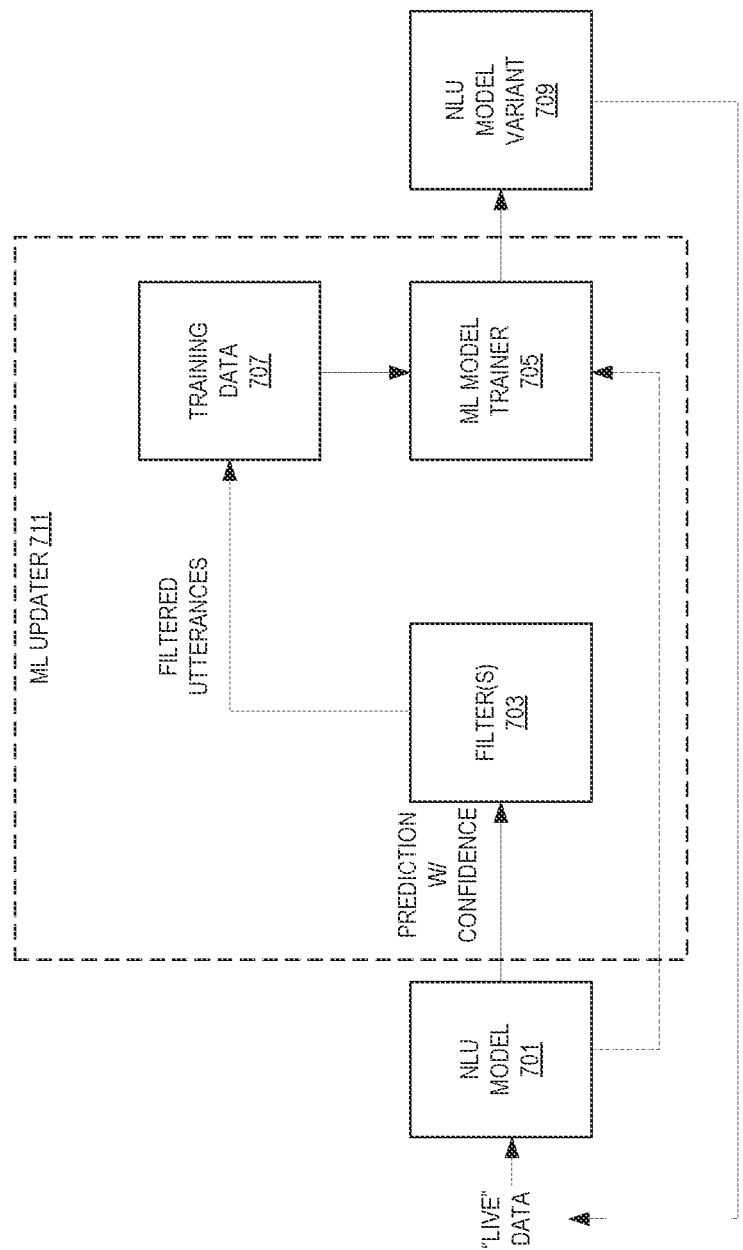
FIG. 7 illustrates embodiments showing the training of a NLU model.

FIG. 7 illustrates embodiments showing the training of a NLU model. This training approach, in some embodiments in a ML updater 711, may be considered a pseudo-labeling and training data augmentation approach. In some embodiments, a NLU model 701 intakes "live" data (utterances) from a user and generates a prediction (and in some embodiments, a confidence value).

One or more filters 703 are applied to the utterances to generate a subset of filtered utterances. In some embodiments, the one or more filters 603 filter out utterances that are too short, do not indicate an intent, have a low predicted confidence, have a predicted intent that does not match the bot definition for the model, and/or have already been used (lack diversity), etc. The filtered utterances (those that survive the filtering) are treated as pseudo-labels. These pseudo-labels are added to existing training data 707.

The NLU model 701 is "retrained" using this modified training data 707 using ML model trainer 705 to generate a NLU model variant 709. This process of collecting live data, filtering out some utterances, and retraining may happen multiple times. In some embodiments, the number of times is set by a user.

Figure 8:
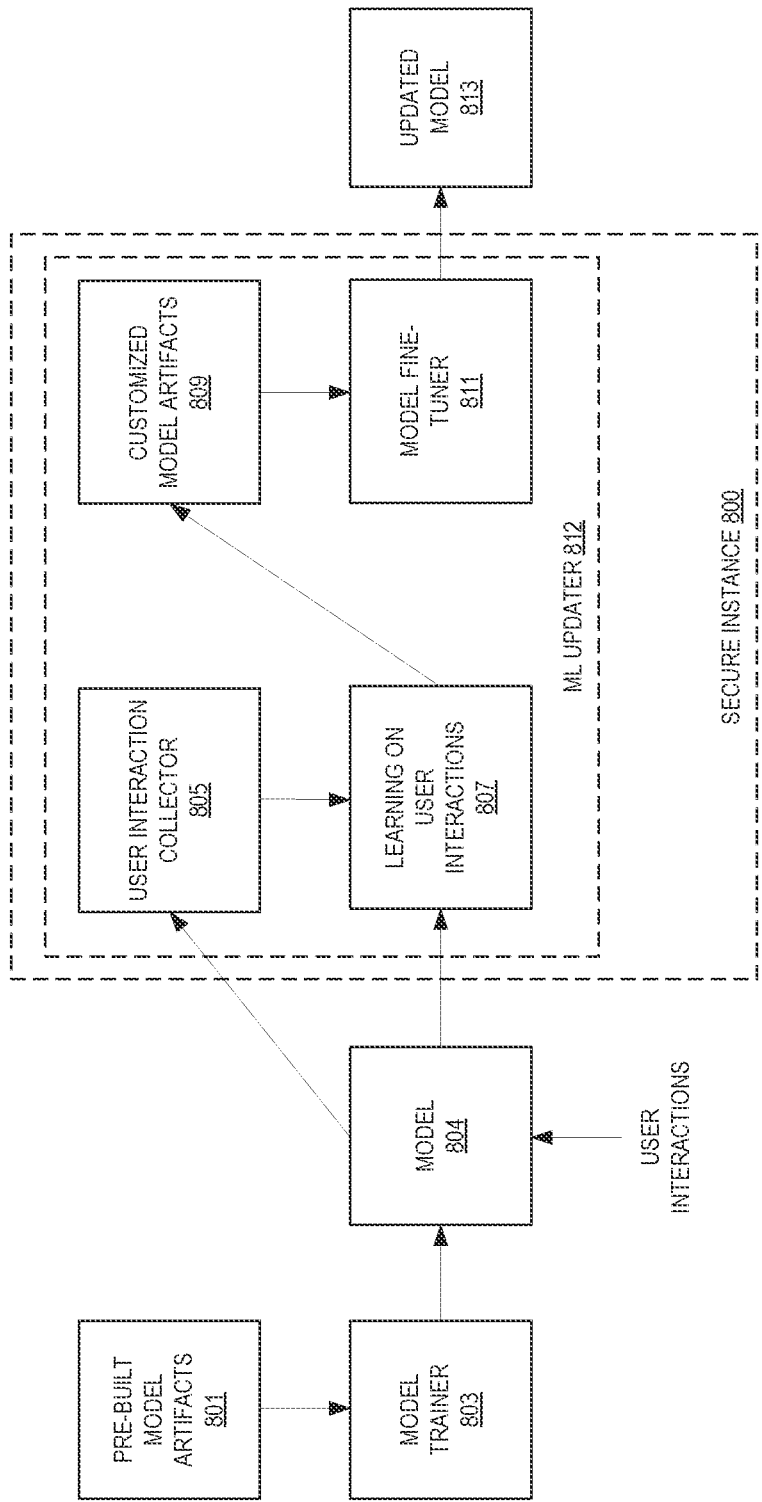
FIG. 8 illustrates embodiments showing the training of a model based on user interactions.

FIG. 8 illustrates embodiments showing the training of a model based on user interactions. As shown, pre-built model artifacts 801 are presented to a model trainer 803 to generate a model 804.

This model 804 interacts with a user. For example, the model 804 may be a part of a chatbot and receives utterances from the user. Those interactions are collected by a user interaction collector 805. One or more components 807 are used to perform learning on the collected user interactions.

For example, the filters, ML model trainers, etc. of the previous figures may comprise at least a portion of these components. The output of the one more components 807 includes customized model artifacts 809 (e.g., an adapted model). The customized model artifacts 809 are then fine-tuned (e.g., retrained) using a model fine-tuner 811 to generate an updated model 813. The data for this tuning may come from existing draining data that has been augmented (e.g., by the learning on user interactions) and/or used in the generation of new data as a part of a conversation generation.

In some embodiments, one or more of the illustrated components are a part of a ML updater 812 in a secure instance 800.

Figure 9:
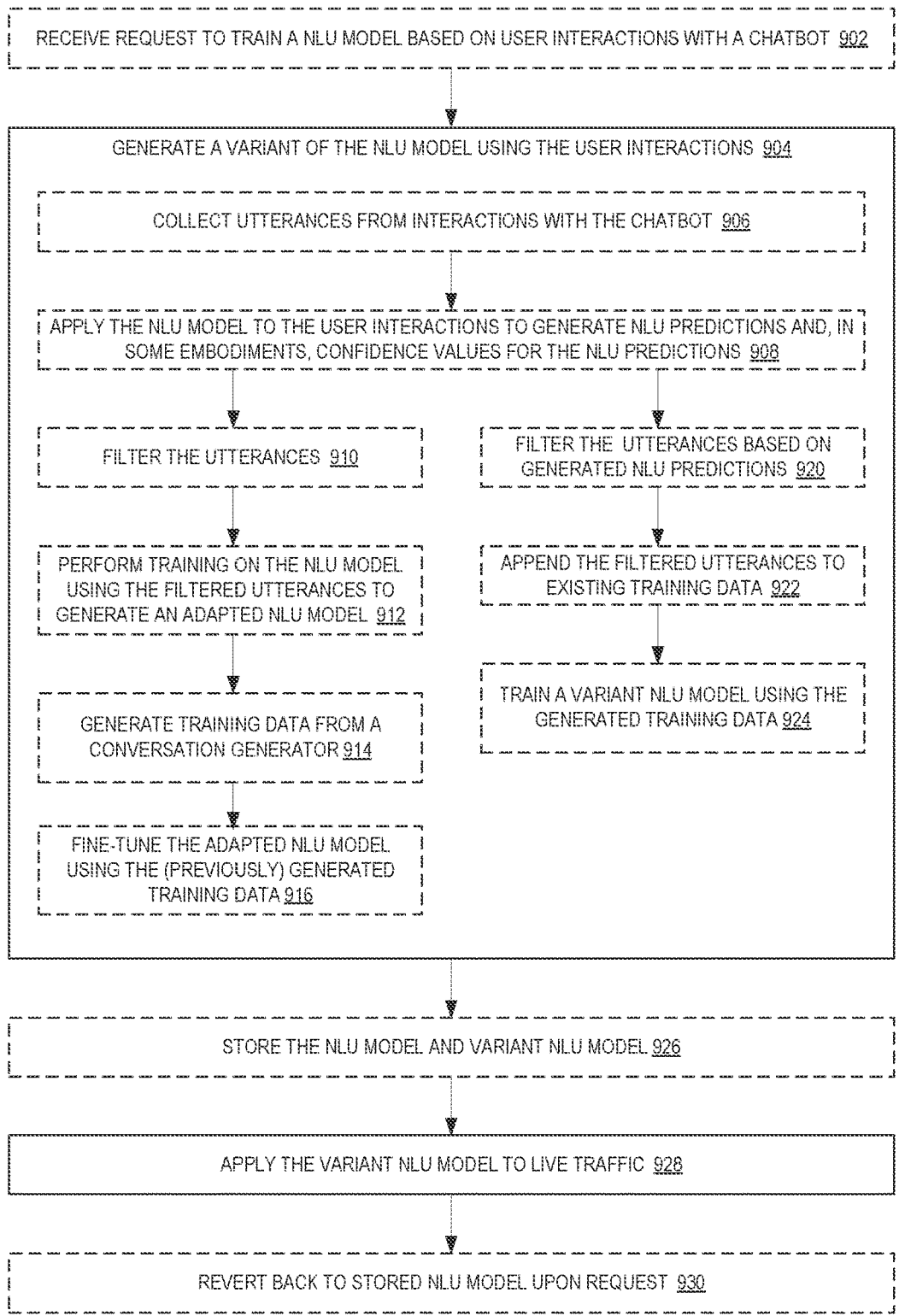
FIG. 9 is a flow diagram illustrating operations of a method of generating a variant of a NLU model using user utterances according to some embodiments.

FIG. 9 is a flow diagram illustrating operations of a method of generating a variant of a NLU model using user utterances according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by hosted ML services of the other figures.

In some embodiments, at 702, a request to train a NLU based on previous user interactions is received. This request may include one or more of an identifier of chatbot having the NLU model, an identifier of the NLU model in particular, an identifier of location to store previous user interactions, a threshold of an amount user interactions to be need to start the training, an identifier of a location to store the trained NLU model, an identifier of a location to store a previously trained NLU model, etc.

A variant of the NLU model of the chatbot is generated using the user interactions at 906. This generation may have several acts. In some embodiments, at 904, utterances are collected from user interactions with the chatbot having a NLU model. Note that user identifiable information is not collected, just the utterances themselves.

In some embodiments, the existing NLU model is applied to "live" user interactions to generate NLU predictions and, in some embodiments, confidence values for the NLU predictions at 908. At this point, there may be divergent paths as shown.

In a first path, the collected utterances are filtered at 910. Examples of filtering were discussed with respect to FIG. 6. The NLU model is trained using the filtered utterances to generate an adapted NLU model at 912. In essence, a "pre-trained" model is generated.

In some embodiments, training data from a conversation generator is generated at 914 to be used to fully train the adapted NLU model. The adapted NLU model is fine-tuned using the (previously) generated training data at 916 to generate the variant of the NLU model.

In a second path, the utterances are filtered according to the NLU predictions at 920. Examples of filtering were discussed with respect to FIG. 7. The The filtered utterances are appended to existing training data at 922. This appending may include properties from the NLU predictions. In essence, pseudo-labels are created. An The NLU model is trained using training data at 924 to generate a variant of the NLU model.

The NLU model and the variant NLU model are stored, in some embodiments, at 926

The variant NLU model is applied to live traffic at 928.

In some embodiments, a reversion back to stored NLU model is made upon request at 930. For example, if the performance is deemed unacceptable a user may request that the previous NLU be used.

Figure 10:
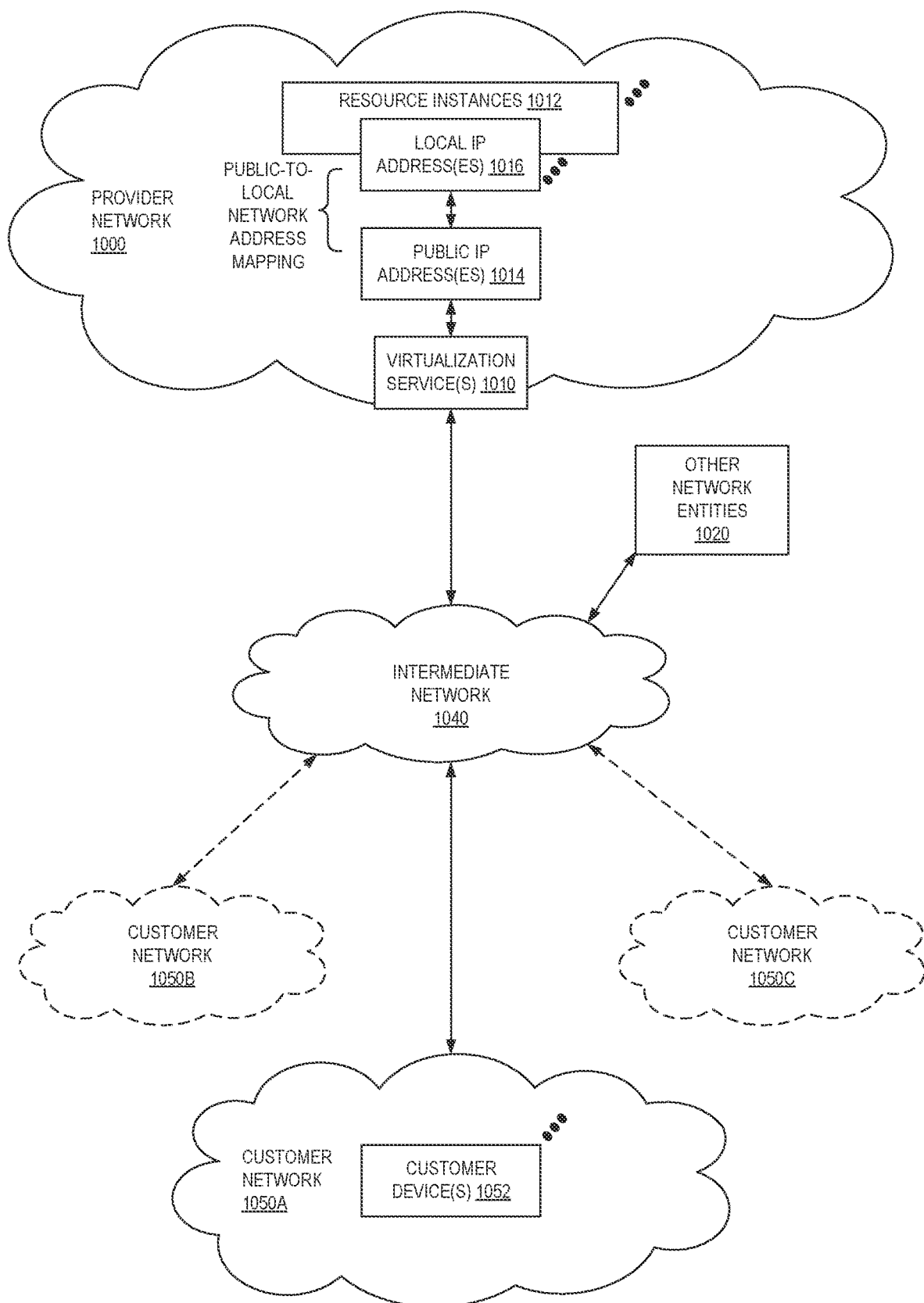
FIG. 10 illustrates an example provider network environment according to some embodiments.

FIG. 10 illustrates an example provider network (or "service provider system") environment according to some embodiments. A provider network 1000 can provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 can be associated with the resource instances 1012; the local IP addresses are the internal network addresses of the resource instances 1012 on the provider network 1000. In some embodiments, the provider network 1000 can also provide public IP addresses 1014 and/or public IP address ranges (e.g., Internet Protocol version 4 (IPv4) or Internet Protocol version 6 (IPv6) addresses) that customers can obtain from the provider 1000.

Conventionally, the provider network 1000, via the virtualization services 1010, can allow a customer of the service provider (e.g., a customer that operates one or more customer networks 1050A-1050C (or "client networks") including one or more customer device(s) 1052) to dynamically associate at least some public IP addresses 1014 assigned or allocated to the customer with particular resource instances 1012 assigned to the customer. The provider network 1000 can also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of the customer network(s) 1050A-1050C can, for example, implement customer-specific applications and present the customer's applications on an intermediate network 1040, such as the Internet. Other network entities 1020 on the intermediate network 1040 can then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 can be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1000; a customer can then assign their allocated public IP addresses to particular resource instances allocated to the customer. These public IP addresses can be referred to as customer public IP addresses, or simply customer IP addresses. Instead of being assigned by the provider network 1000 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
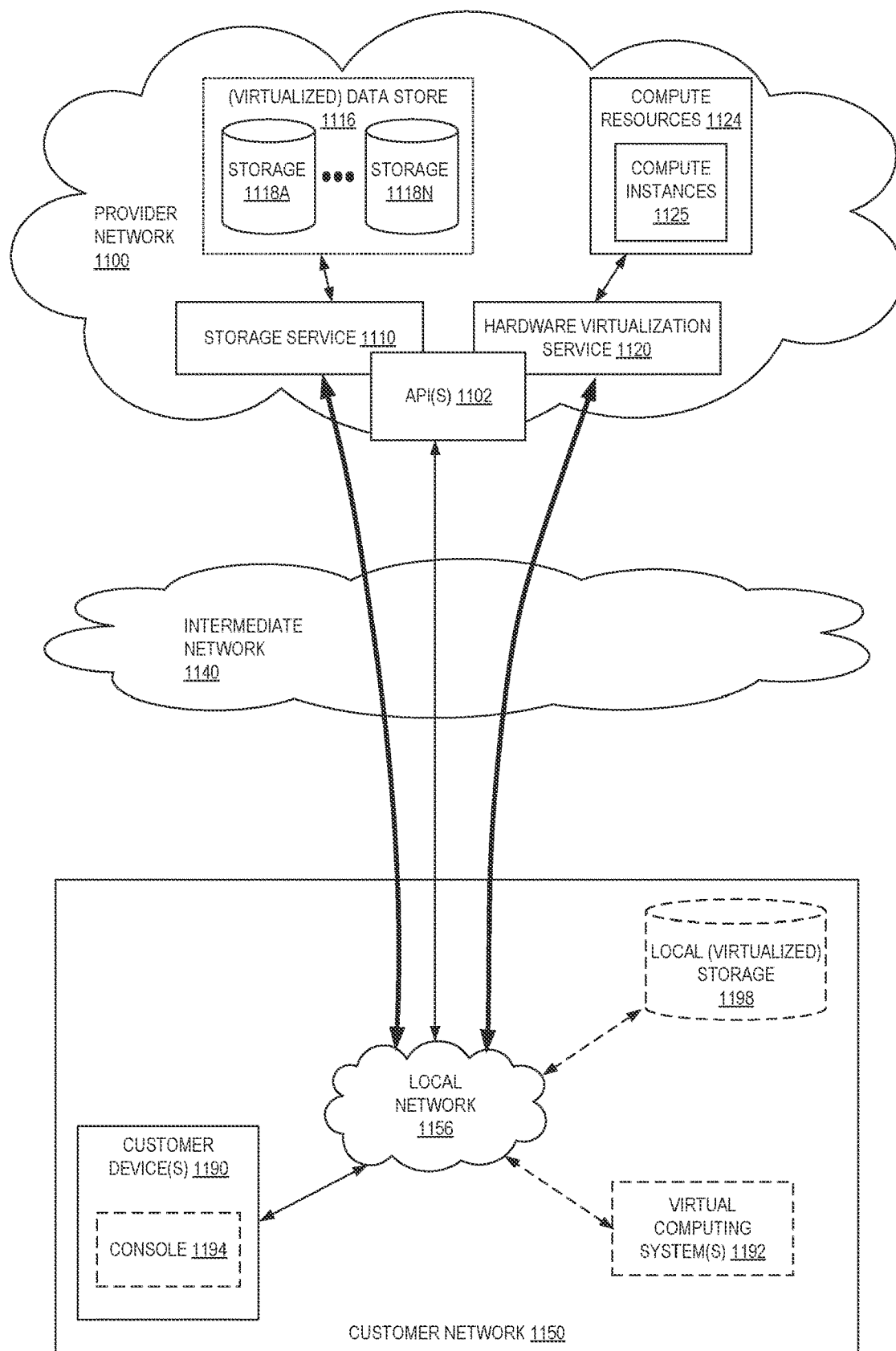
FIG. 11 is a block diagram of an example provider network that provides a storage service and a hardware virtualization service to customers according to some embodiments.

FIG. 11 is a block diagram of an example provider network environment that provides a storage service and a hardware virtualization service to customers, according to some embodiments. A hardware virtualization service 1120 provides multiple compute resources 1124 (e.g., compute instances 1125, such as VMs) to customers. The compute resources 1124 can, for example, be provided as a service to customers of a provider network 1100 (e.g., to a customer that implements a customer network 1150). Each computation resource 1124 can be provided with one or more local IP addresses. The provider network 1100 can be configured to route packets from the local IP addresses of the compute resources 1124 to public Internet destinations, and from public Internet sources to the local IP addresses of the compute resources 1124.

The provider network 1100 can provide the customer network 1150, for example coupled to an intermediate network 1140 via a local network 1156, the ability to implement virtual computing systems 1192 via the hardware virtualization service 1120 coupled to the intermediate network 1140 and to the provider network 1100. In some embodiments, the hardware virtualization service 1120 can provide one or more APIs 1102, for example a web services interface, via which the customer network 1150 can access functionality provided by the hardware virtualization service 1120, for example via a console 1194 (e.g., a web-based application, standalone application, mobile application, etc.) of a customer device 1190. In some embodiments, at the provider network 1100, each virtual computing system 1192 at the customer network 1150 can correspond to a computation resource 1124 that is leased, rented, or otherwise provided to the customer network 1150.

From an instance of the virtual computing system(s) 1192 and/or another customer device 1190 (e.g., via console 1194), the customer can access the functionality of a storage service 1110, for example via the one or more APIs 1102, to access data from and store data to storage resources 1118A-1118N of a virtual data store 1116 (e.g., a folder or "bucket," a virtualized volume, a database, etc.) provided by the provider network 1100. In some embodiments, a virtualized data store gateway (not shown) can be provided at the customer network 1150 that can locally cache at least some data, for example frequently accessed or critical data, and that can communicate with the storage service 1110 via one or more communications channels to upload new or modified data from a local cache so that the primary store of data (the virtualized data store 1116) is maintained. In some embodiments, a user, via the virtual computing system 1192 and/or another customer device 1190, can mount and access virtual data store 1116 volumes via the storage service 1110 acting as a storage virtualization service, and these volumes can appear to the user as local (virtualized) storage 1198.

While not shown in FIG. 11, the virtualization service(s) can also be accessed from resource instances within the provider network 1100 via the API(s) 1102. For example, a customer, appliance service provider, or other entity can access a virtualization service from within a respective virtual network on the provider network 1100 via the API(s) 1102 to request allocation of one or more resource instances within the virtual network or within another virtual network.

Illustrative Systems

Figure 12:
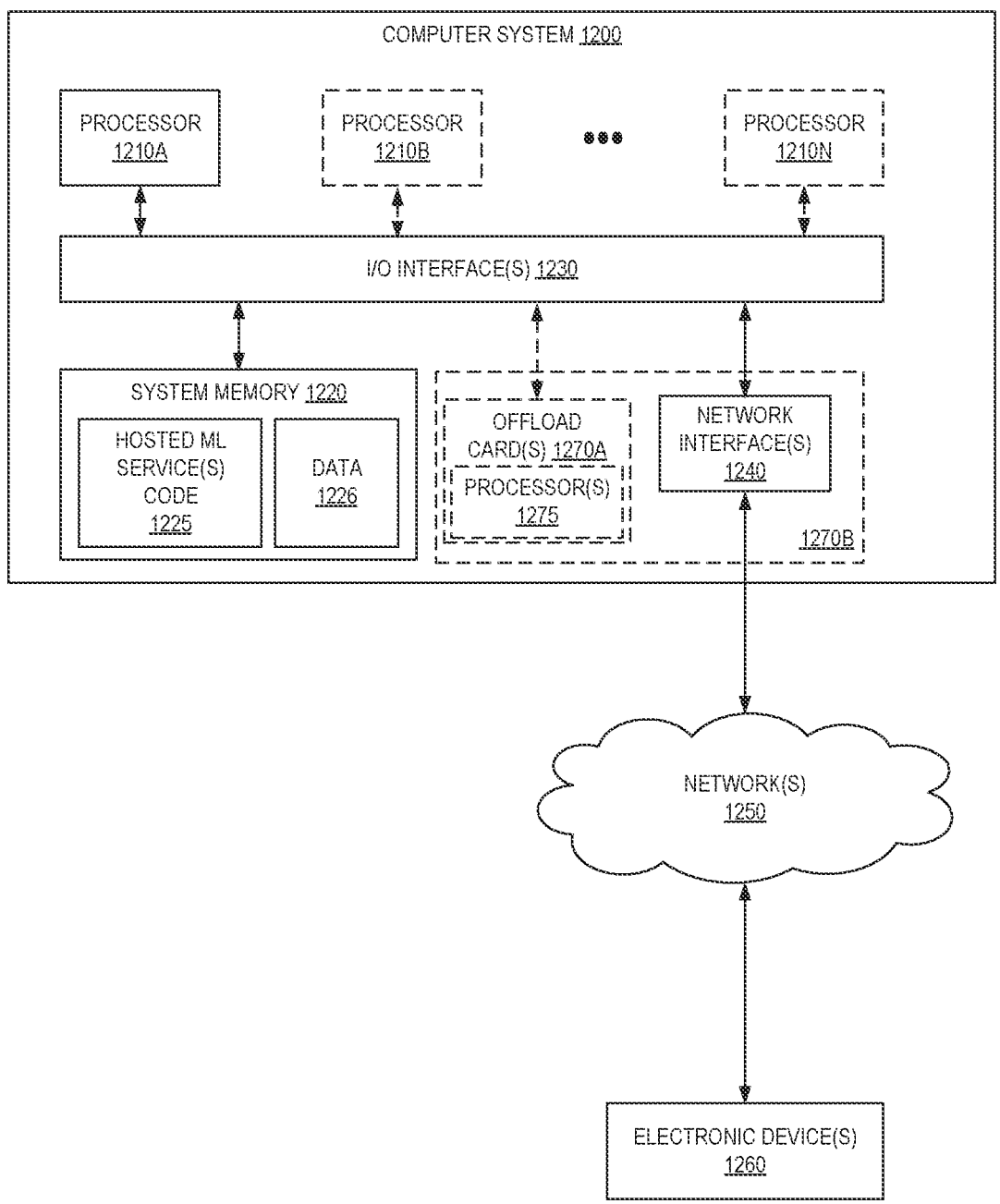
FIG. 12 is a block diagram illustrating an example computer system that can be used in some embodiments.

In some embodiments, a system that implements a portion or all of the techniques described herein can include a general-purpose computer system, such as the computer system 1200 illustrated in FIG. 12, that includes, or is configured to access, one or more computer-accessible media. In the illustrated embodiment, the computer system 1200 includes one or more processors 1210 coupled to a system memory 1220 via an input/output (I/O) interface 1230. The computer system 1200 further includes a network interface 1240 coupled to the I/O interface 1230. While FIG. 12 shows the computer system 1200 as a single computing device, in various embodiments the computer system 1200 can include one computing device or any number of computing devices configured to work together as a single computer system 1200.

In various embodiments, the computer system 1200 can be a uniprocessor system including one processor 1210, or a multiprocessor system including several processors 1210 (e.g., two, four, eight, or another suitable number). The processor(s) 1210 can be any suitable processor(s) capable of executing instructions. For example, in various embodiments, the processor(s) 1210 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1210 can commonly, but not necessarily, implement the same ISA.

The system memory 1220 can store instructions and data accessible by the processor(s) 1210. In various embodiments, the system memory 1220 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1220 as hosted ML service(s) code 1225 (e.g., executable to implement, in whole or in part, the hosted ML service(s) 207) and data 1226.

In some embodiments, the I/O interface 1230 can be configured to coordinate I/O traffic between the processor 1210, the system memory 1220, and any peripheral devices in the device, including the network interface 1240 and/or other peripheral interfaces (not shown). In some embodiments, the I/O interface 1230 can perform any necessary protocol, timing, or other data transformations to convert data signals from one component (e.g., the system memory 1220) into a format suitable for use by another component (e.g., the processor 1210). In some embodiments, the I/O interface 1230 can include support for devices attached through various types of peripheral buses, such as a variant of the Peripheral Component Interconnect (PCI) bus standard or the Universal Serial Bus (USB) standard, for example. In some embodiments, the function of the I/O interface 1230 can be split into two or more separate components, such as a north bridge and a south bridge, for example. Also, in some embodiments, some or all of the functionality of the I/O interface 1230, such as an interface to the system memory 1220, can be incorporated directly into the processor 1210.

The network interface 1240 can be configured to allow data to be exchanged between the computer system 1200 and other devices 1260 attached to a network or networks 1250, such as other computer systems or devices as illustrated in FIG. 1, for example. In various embodiments, the network interface 1240 can support communication via any suitable wired or wireless general data networks, such as types of Ethernet network, for example. Additionally, the network interface 1240 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1200 includes one or more offload cards 1270A or 1270B (including one or more processors 1275, and possibly including the one or more network interfaces 1240) that are connected using the I/O interface 1230 (e.g., a bus implementing a version of the Peripheral Component Interconnect-Express (PCI-E) standard, or another interconnect such as a Quick-Path interconnect (QPI) or UltraPath interconnect (UPI)). For example, in some embodiments the computer system 1200 can act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some embodiments the offload card(s) 1270A or 1270B can perform compute instance management operations, such as pausing and/or un-pausing compute instances, launching and/or terminating compute instances, performing memory transfer/copying operations, etc. These management operations can, in some embodiments, be performed by the offload card(s) 1270A or 1270B in coordination with a hypervisor (e.g., upon a request from a hypervisor) that is executed by the other processors 1210A-1210N of the computer system 1200. However, in some embodiments the virtualization manager implemented by the offload card(s) 1270A or 1270B can accommodate requests from other entities (e.g., from compute instances themselves), and cannot coordinate with (or service) any separate hypervisor.

In some embodiments, the system memory 1220 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1200 via the I/O interface 1230. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1200 as the system memory 1220 or another type of memory. Further, a computer-accessible medium can include transmission media or signals such as electrical, electromagnetic, or digital signals, conveyed via a communication medium such as a network and/or a wireless link, such as can be implemented via the network interface 1240.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   collecting utterances from interactions with a natural language understanding (NLU) model;
   filtering the utterances to generate filtered utterances, wherein the filtering removes any utterances that are too short, do not indicate an intent, have a low predicted confidence, have a predicted intent that does not match a bot definition for the NLU model, or have already been used;
   generating a variant of the NLU model by:
      appending the filtered utterances to training data to generate modified training data,
      retraining the NLU model on the modified training data to generate the variant of the NLU model, wherein the retraining comprises:
         building an intent graph based on the bot definition; and
         traversing the intent graph to generate conversation templates for intents of the intent graph, wherein the conversation templates are paths through the intent graph, and wherein at least one of the intents of the intent graph is a conditional intent that requires an output context value of a previous intent of the intent graph to match an input context value of the conditional intent; and
   applying the variant of the NLU model to subsequent interactions.

2. The computer-implemented method of claim 1, wherein the filtering is based at least in part on at least one of a prediction for the utterances using the NLU model.

3. The computer-implemented method of claim 1, wherein the generating a variant of the NLU model is started based on receiving a request, the request including one or more an identifier of a chatbot having the NLU model, an identifier of the NLU model, an identifier of a location to store previous user interactions, a threshold amount of user interactions needed to start the training, an identifier of a location to store the variant of the NLU model, or an identifier of a location to store a previously trained NLU model.

4. A computer-implemented method comprising:
   collecting utterances from interactions with a machine learning (ML) model;
   filtering the utterances to generate filtered utterances, wherein the filtering removes any utterances that are too short, do not indicate an intent, have a low predicted confidence, have a predicted intent that does not match a bot definition for the NLU model, or have already been used;
   generating a variant of the ML model using the filtered utterances by:
      training the ML model on the filtered utterances to generate an adapted ML model, and
      training the adapted ML model on training data from a bot definition of the ML model to generate the variant of the ML model, wherein the training comprises:
         building an intent graph based on the bot definition; and traversing the intent graph to generate conversation templates for intents of the intent graph, wherein the conversation templates are paths through the intent graph, and wherein at least one of the intents of the intent graph is a conditional intent that requires an output context value of a previous intent of the intent graph to match an input context value of the conditional intent; and applying the variant of the ML model to subsequent interactions.

5. The computer-implemented method of claim 4, wherein the ML model is a natural language understanding (NLU) model that is a part of a chatbot.

6. The computer-implemented method of claim 4, wherein the generating a variant of the ML model is started based on an amount of collected data exceeding a threshold.

7. The computer-implemented method of claim 4, wherein the generating a variant of the ML model is started based on receiving a request, the request including one or more an identifier of a chatbot having the NLU model, an identifier of the NLU model, an identifier of a location to store previous user interactions, a threshold amount of user interactions needed to start the training, an identifier of a location to store the variant of the NLU model, or an identifier of a location to store a previously trained NLU model.

8. The computer-implemented method of claim 4, further comprising verifying the variant of the ML model against at least one of live data and a test set for accuracy.

9. The computer-implemented method of claim 4, wherein the ML model is a transformer-based model.

10. The computer-implemented method of claim 4, further comprising storing the ML model and the variant of the ML model prior to applying the variant of the ML model.

11. The computer-implemented method of claim 4, wherein the training the ML model on the filtered utterances comprises performing mask language model (MLM) training.

12. The computer-implemented method of claim 4, further comprising generating the training data set by:
  creating a plurality of conversations from a chatbot definition, and
  extracting data from the plurality of conversations.

13. A system comprising:
  a first one or more electronic devices to implement a chatbot service in a multi-tenant provider network; and
  a second one or more electronic devices to implement a machine learning (ML) model updating service in the multi-tenant provider network, the ML model updating service including instructions that upon execution cause the ML model updating service to:
    collect utterances from interactions with a ML model using the chatbot service;
    filter the utterances to generate filtered utterances, wherein the filtering removes any utterances that are too short, do not indicate an intent, have a low predicted confidence, have a predicted intent that does not match a bot definition for the NLU model, or have already been used;
    generate a variant of the ML model using the filtered utterances by:
      training the ML model on the filtered utterances to generate an adapted ML model, and
      training the adapted ML model on training data from a bot definition of the ML model to generate the variant of the ML model, wherein the training comprises:
        building an intent graph based on the bot definition; and
        traversing the intent graph to generate conversation templates for intents of the intent graph, wherein the conversation templates are paths through the intent graph, and wherein at least one of the intents of the intent graph is a conditional intent that requires an output context value of a previous intent of the intent graph to match an input context value of the conditional intent; and
    apply the variant of the ML model to subsequent interactions with the chatbot service.

14. The system of claim 13, wherein the ML model is a natural language understanding (NLU) model that is a part of a chatbot.

15. The system of claim 13, wherein the generating a variant of the ML model is started based on an amount of collected data exceeding a threshold.

16. The system of claim 13, wherein the generating a variant of the ML model is started based on receiving a request, the request including one or more an identifier of a chatbot having the NLU model, an identifier of the NLU model, an identifier of a location to store previous user interactions, a threshold amount of user interactions needed to start the training, an identifier of a location to store the variant of the NLU model, or an identifier of a location to store a previously trained NLU model.

17. The system of claim 13, wherein the ML model updating service includes further instructions that upon execution cause the ML model updating service to verify the variant of the ML model against at least one of live data and a test set for accuracy.

18. The system of claim 13, wherein the ML model is a transformer-based model.

19. The system of claim 13, wherein the ML model updating service includes further instructions that upon execution cause the ML model updating service to store the ML model and the variant of the ML model prior to applying the variant of the ML model.

20. The system of claim 13, wherein the training the ML model on the filtered utterances comprises performing mask language model (MLM) training.

* * * * *